(12) United States Patent
Ibrahim et al.

(10) Patent No.: US 6,880,062 B1
(45) Date of Patent: *Apr. 12, 2005

(54) DATA MOVER MECHANISM TO ACHIEVE SAN RAID AT WIRE SPEED

(75) Inventors: Rahim Ibrahim, Mountain View, CA (US); Nghiep Tran, San Jose, CA (US); Tuan Nguyen, San Jose, CA (US); Chan Ng, San Jose, CA (US)

(73) Assignee: Candera, Inc., Milpitas, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 10/224,618

(22) Filed: Aug. 19, 2002

Related U.S. Application Data

(63) Continuation-in-part of application No. 10/077,199, filed on Feb. 13, 2002.
(60) Provisional application No. 60/268,694, filed on Feb. 13, 2001.

(51) Int. Cl.⁷ .............................................. G06F 12/00
(52) U.S. Cl. ....................... 711/202; 711/206; 711/209; 709/216; 709/217
(58) Field of Search ........................ 711/111, 112, 114, 711/154, 202, 203, 206, 209; 709/213, 216, 217, 232

(56) References Cited

U.S. PATENT DOCUMENTS 6,594,745 B2 * 7/2003 Grover ....................... 711/162
6,625,650 B2 * 9/2003 Stelliga ....................... 709/226
6,714,952 B2 * 3/2004 Dunham et al. ............ 707/204

OTHER PUBLICATIONS

Lee, et al., "Logical Disks: User–Controllable I/O for Scientific Applications", © 1996 IEEE, p. 340–347.*

R. Montague et al., "Virtualizing The San" Morgan Keegan Equity Research, pp. 20, Morgan Keegan & Company, Inc. Memphis TN, (Jul. 5, 2000).

* cited by examiner

*Primary Examiner*—Donald Sparks
*Assistant Examiner*—Brian R. Peugh
(74) *Attorney, Agent, or Firm*—Brian N. Young; Townsend and Townsend and Crew, LLP

(57) ABSTRACT

A Virtual Storage Server is provided for transferring data between a source storage device and one or more destination storage devices. A write command is issued to the one or more destinations for an amount of data. In response, one or more Transfer Ready Responses are returned indicating the amount of data the destinations are prepared to receive. The Virtual Storage Server then sends a read command to the source for an amount of data based on the amounts of data in the Transfer Ready Responses. The data is then transferred from the source storage device through the Virtual Storage Server to the one or more destination storage devices. Because data is transferred only in amounts that the destination is ready to receive, the Virtual Storage Server does not need a large buffer, and can basically send data received at wire speed. This process continues until the amount of data in the write command is transferred to the one or more destination storage devices.

40 Claims, 6 Drawing Sheets

DATA MOVER MECHANISM TO ACHIEVE SAN RAID AT WIRE SPEED

CROSS-REFERENCES TO RELATED APPLICATIONS

This application is a continuation-in-part of U.S. Application No. 10/077,199, which was filed on Feb. 13, 2002 and claims priority from U.S. Provisional Application No. 60/268,694, filed Feb. 13, 2001 and titled "Virtual Storage Systems", both of which are incorporated herein for all purposes.

BACKGROUND OF THE INVENTION

The present invention generally relates to storage area networks (SANs) using Redundant Arrays of Independent Disks (RAID) and more specifically to transferring and mirroring data in a virtual storage environment.

A traditional RAID controller performs many tasks connected with writing and reading data to and from individual disk drives. It must maintain the redundancy arrangement depending on the type of RAID used, handle recovery from errors, and reorganize the data as needed.

One method of ensuring the reliable access to data is data mirroring. Data mirroring involves maintaining multiple copies of data in different mirrored locations. In order to generate mirrored copies of data, data from a source location is copied to a destination location. Typically, the process of copying data involves first sending a read command to the source location. Then, data to be mirrored is read from the source location and stored in a buffer as the data is received. Once the process of reading data is started, a write command is issued to the destination location. When the destination location is ready to receive data, the data is read out of the buffer and transferred to the destination location.

The above method of mirroring data has many disadvantages. Because a read command is sent before a write command, data is sent from the source before the destination is ready to receive the data. Thus, data is stored in the buffer until the destination is ready to receive data. This may result in a large amount of data being stored in the buffer during the mirroring process. Therefore, a buffer that is capable of storing large amounts of data is necessary.

A typical storage controller would require its own large buffer to handle the data mirroring, error recovery, and other RAID functions for moving data between the physical storage arrays.

In a network environment, routers are used to route packets of data to destinations without any intention of buffering the data packets, thus sending the data at "wire speed". This is possible because the packets of data sent are relatively small. Achieving wire speed for large bulk data transfers for applications, such as are necessary for mirroring, error recovery, and other RAID functions by a network storage server over a network is problematic.

BRIEF SUMMARY OF THE INVENTION

In one embodiment of the present invention, a Virtual Storage Server is provided for transferring data between a source storage device and one or more destination storage devices. A write command is issued to the one or more destinations for an amount of data. In response, one or more Transfer Ready Responses are returned indicating the amount of data the destinations are prepared to receive. The Virtual Storage Server then sends a read command to the source for an amount of data based on the amounts of data in the Transfer Ready Responses. The data is then transferred from the source storage device through the Virtual Storage Server to the one or more destination storage devices. Because data is transferred only in amounts that the destination is ready to receive, the Virtual Storage Server does not need a large buffer, and can basically send data received at wire speed. This process continues until the amount of data in the write command is transferred to the one or more destination storage devices.

In one embodiment, where multiple destinations are to be written to, an amount of data to be transferred from the source is chosen as the smallest amount of data in all of the returned Transfer Ready Responses. The Virtual Storage Server prevents data errors or data corruption due to changing data during the multiple transfer operations by issuing a read span lock command to the source, and a write span lock to each of the destinations. Thus, data consistency is ensured between destinations.

A further understanding of the nature and advantages of the invention herein may be realized by reference of the remaining portions in the specifications and the attached drawings.

DETAILED DESCRIPTION OF THE INVENTION

Figure 1:
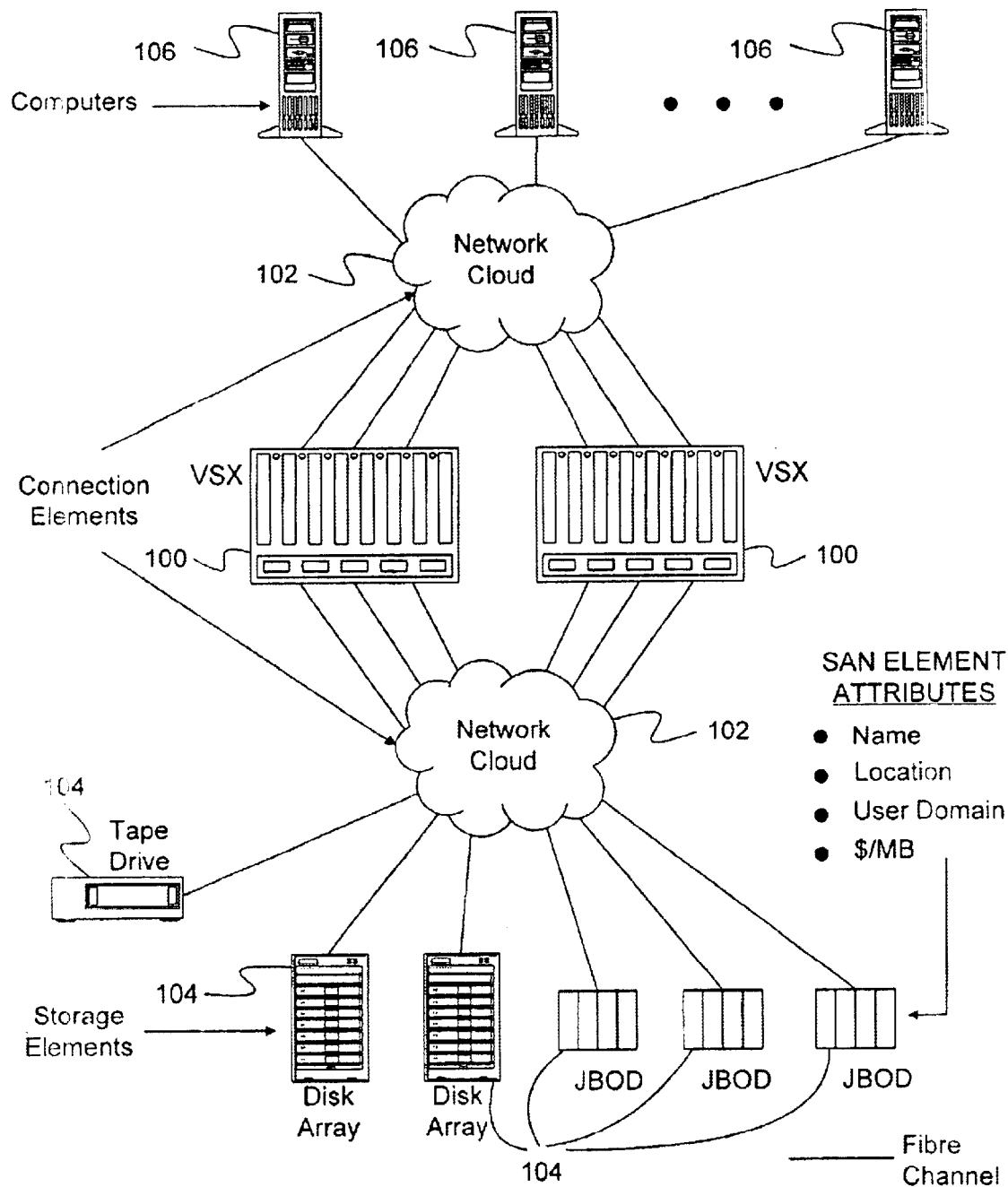
FIG. 1 shows a storage server according to an embodiment of the present invention.

FIG. 1 shows a storage server (VSX) 100 according to an embodiment of the present invention. The figure also shows a storage area network (SAN) 102, a number of physical storage devices 104, and a number of host computers 106. The storage server 100 is also referred to as a Virtual Storage Exchange (VSX) and is further detailed in FIGS. 2A–2B.

The SAN 102 can be any type of computer network. It is referred to as a storage area network in the present application because that is its relevant function with respect to the embodiments of the present invention. In an embodiment of the present invention, the SAN 102 is a Fibre Channel network, the host computers 106 and the storage devices 102 are configured to communicate with a Fibre Channel network, and VSX 100 is also configured to communicate with a Fibre Channel network. Thus, VSX 100 can be easily added to an existing SAN.

The physical storage devices 104 include tape drives, disk arrays, JBODs ("just a bunch of disks"), or other types of data storage devices. The physical storage devices 104 can be connected directly to the host computers 106, can be connected directly to the host computers 106 via the SAN 102 or can be indirectly connected to the host computers 106 via the SAN 102 and VSX 100. In any case, SAN 102 is optional. In one embodiment of the present invention, management of storage virtualization is implemented by using VSX 100 to indirectly connect the storage devices 104 to the host computers 106.

The host computers 106 can be servers or stand-alone computers. The host computers 106 can be directly connected to the SAN 102 or indirectly connected via a switch, router, or other communication link.

Figure 2A:
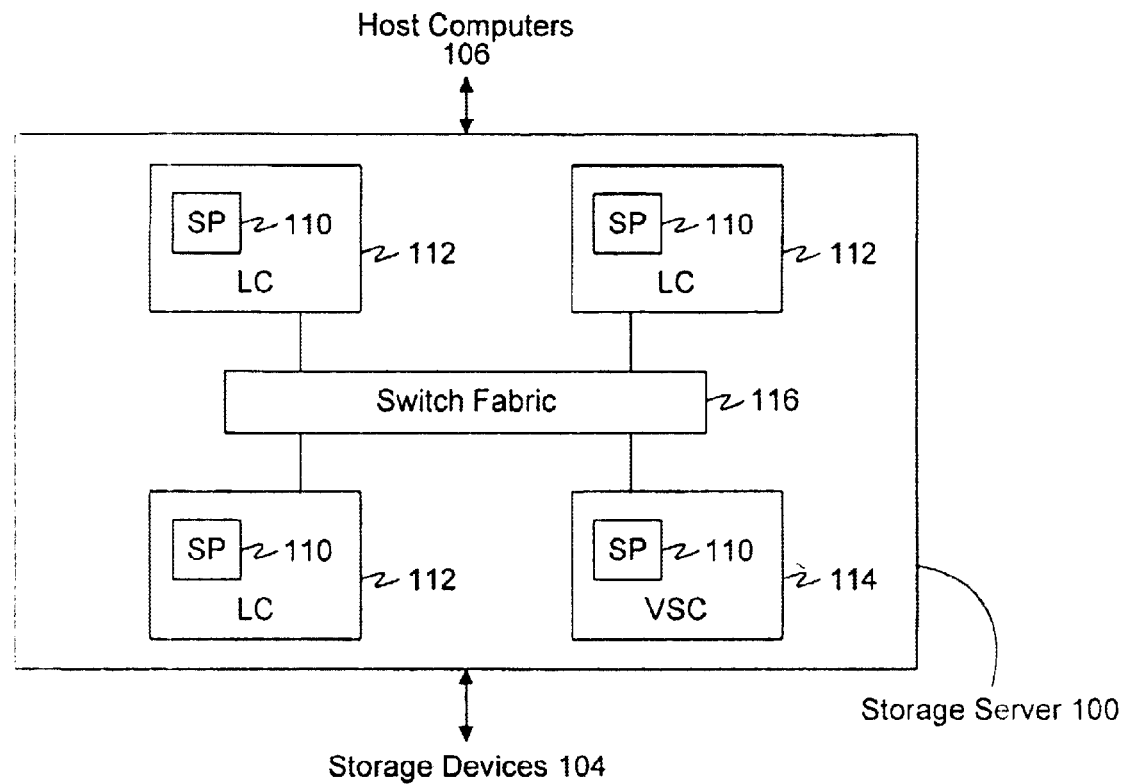
FIG. 2A is a Block diagram of Virtual Storage Exchange (VSX) showing the hardware components related to embodiments of the present invention.

FIG. 2A is a Block diagram of VSX 100 showing the hardware components related to embodiments of the present invention, including a storage processor 110, a line card 112, a Virtual Storage Control card 114, and an internal switch fabric 116.

VSX 100 may include one or more storage processors 110. The storage processors 110 process the storage commands and data to be stored or retrieved as information flows between the host computers 106 and the storage devices 104. One or more of the storage processors 110 may be included on each line card 112. VSX 100 includes space for numerous line cards 112, so the capabilities of VSX 100 can be modularly increased by adding more line cards 112 or more storage processors 110. Each storage processor 110 is associated with one or more ports of VSX 100.

VSX 100 may include one or more Virtual Storage Control cards 114. The Virtual Storage Control cards control the operation of VSX 100 and control the line cards 1112, which perform the actual work of transferring commands and data.

The switch fabric 116 connects the storage processors 110. The switch fabric switches information received at one internal port to another internal port of VSX 100. For example, when a host computer 106 wants to read data stored on the storage area network 102, its request is processed by the storage processor 110 associated with the port associated with that host computer 106. That storage processor 110 is referred to as the upstream storage processor 110. The upstream storage processor 110 communicates with a downstream storage processor 110 associated with the port associated with the storage device 104 storing the data to be read, via the switch fabric 1116. Then the switch fabric 116 transfers the data read from the storage device to the host computer 106, via the downstream and upstream storage processors 110.

Figure 2B:
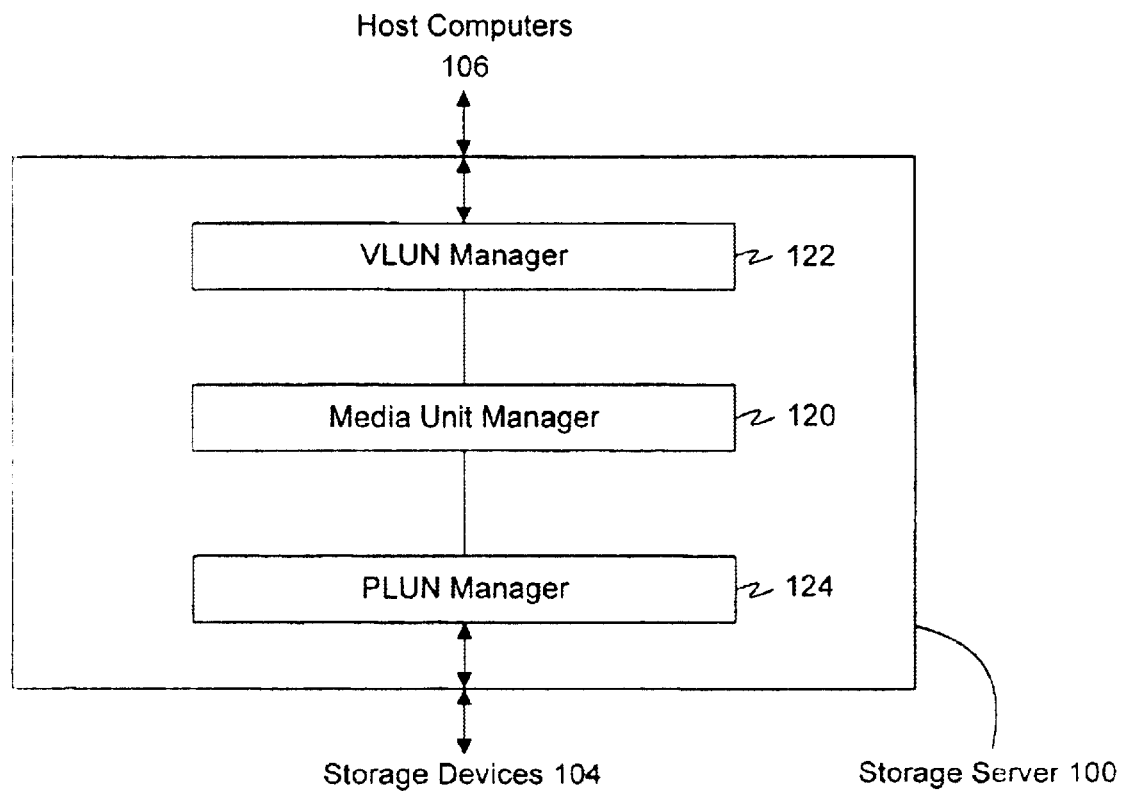
FIG. 2B is a Block diagram of the VSX showing the functionality relevant to embodiments of the present invention.

FIG. 2B is a Block diagram of VSX 100 showing the functionality relevant to embodiments of the present invention. The functions of VSX 100 may be implemented by one or more processors that execute processing according to one or more computer programs, microcode segments, hardware structures, or combinations thereof. The functions relevant to the present invention are the media unit (MU) manager 120, the virtual logical unit (virtual LUN or VLUN) manager 122, and the physical logical unit (physical LUN or PLUN) manager 124. Additional details of VSX 100 are provided in other applications assigned to the present assignee and filed on Feb. 13, 2002 that claim the benefit from Provisional Application No. 60/268,694 and are hereby incorporated herein by reference for all purposes: U.S. Nonprovisional patent application Ser. No. 10/077,696, entitled "Silicon Based Storage Virtualization Server"; U.S. Nonprovisional patent application Ser. No. 10/076,855, entitled "Storage Virtualization and Storage Management to Provide Higher Level Storage Services"; U.S. Nonprovisional patent application No. 10076,909, entitled "Method and Apparatus for Identifying Storage Devices"; U.S. Nonprovisional patent application No. 10/077,482, entitled "System and Method for Policy Based Storage Provisioning and Management"; U.S. Nonprovisional patent-application No. 10/077,181, entitled "Virtual Data Center"; U.S. Nonprovisional patent application Ser. No. 10/076,906, entitled "Failover Processing in a Storage System"; and U.S. Nonprovisional patent application Ser. No. 10/076,878, entitled "Method for Device Security in a Heterogeneous Storage Network Environment". These applications are incorporated herein by reference for all purposes.

The PLUN manager 124 manages data and command transfer to and from the storage devices 104. Each storage device 104 may have associated therewith a PLUN that is used for identifying each particular storage device 104.

The VLUN manager 122 manages data and command transfer to and from the host computers 106. Each host computer 106 may have access with one or more VLUNs. Each VLUN represents a virtual address space (e.g., gigabytes of storage) with defined attributes (e.g., performance parameters, reliability level, etc.). As such, each host computer 106 exchanges data and commands with VSX 100 with reference to a particular VLUN.

The MU manager 120 basically translates between VLUNs and PLUNs. The MU manager 120 is responsible for managing the address space of all the storage devices 104 (physical LUNs) connected to VSX 100. The MU manager 120 also manages the address space of the storage constructs built within VSX 100, including slices, concatenations, RAID0 (stripes) and RAID1 (mirrors).

The MU manager 120 uses an abstract Block-storage addressing technique that enables address spaces to be treated in a logical manner, regardless of the underlying storage constructs or physical LUNs. These logical address spaces can be combined together into more-complex and feature rich storage constructs, which are also treated simply as abstract Block-storage address spaces.

These logical address spaces can be configured to appear as VLUNs on a multi-ported storage device. This process of presenting physical LUNs as logical address spaces on virtual devices is referred to as storage virtualization. Abstract Block-storage addressing is achieved via a data structure known as a media unit (MU).

Figure 3:
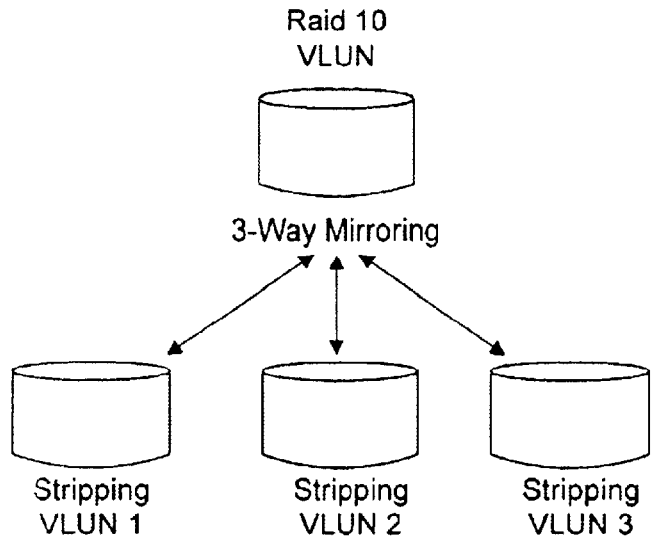
FIG. 3 illustrates a three way mirroring according to one embodiment.

A VLUN may be composed of another VLUN, VLUN slices, PLUN, and/or PLUN slices. Additionally, multilevel RAID mirroring may be accomplished using VLUNs. For example, a RAID 10 VLUN (RAID 1+RAID 0) may be generated with three-way mirroring VLUNs where each mirroring VLUN is a RAID 0 (striping) VLUN. FIG. 3 depicts an example of three-mirroring.

Figure 4:
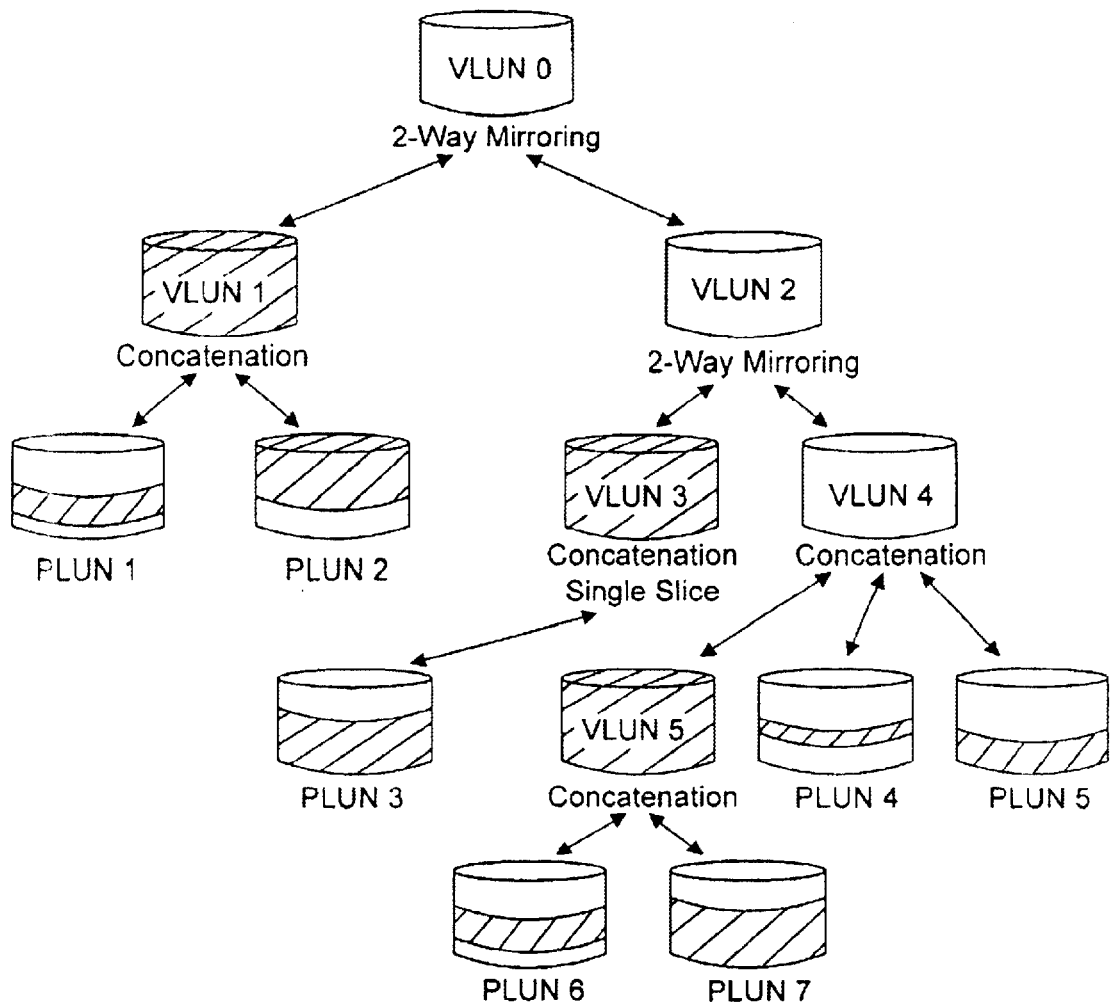
FIG. 4 illustrates a multi-level multi-mirroring VLUN construction according to one embodiment.

FIG. 4 illustrates a multi-level multi-mirroring redundant array of independent disks (RAID) VLUN construction according to one embodiment. As shown, VLUN0 is generated with two-way mirroring with VLUN1 and VLUN2. VLUN1 is the concatenation of a slice of a physical logical unit PLUN1 and a slice of PLUN2. VLUN2 is two-way mirrored from VLUN3 and VLUN4. VLUN3 is the concatenation of a single slice of PLUN3. VLUN4 is the concatenation of VLUN5, a slice of PLUN4, and a slice of PLUN5. Finally, VLUN5 is the concatenation of a slice of PLUN6 and a slice of PLUN7. It can be seen that multi-level mirror enables VLUN0 to be capable of composed of unlimited number of mirrored copies.

VSX 100 facilitates the data mirroring process by acting as an agent when mirroring data from a source LUN to any number of destination LUNs. For example, when a read or write command is issued from a host VLUN0, VLUN0 determines the mirroring structure under it. VLUN0 initiates a read or write command to VLUN1 and VLUN2 within VSX 100. VSX 100 then communicates with VLUN1 and VLUN2 to facilitate the mirroring processes. Once VLUN1 and VLUN2 receive the read or write command, VLUN1 and VLUN2 are configured to determine the mirroring structure under them. For example, VLUN2 initiates a read or write command to mirror data in VLUN3 and VLUN4. VLUN4 then determines it is a concatenation of VLUN5, PLUN4 and PLUN5 and issues a read or write command to VLUN5, PLUN4, and PLUN5. VLUN5 also determines it is a concatenation of PLUN6 and PLUN7 and issues a read or write command to PLUN6 and PLUN7.

For example, to set up mirroring LUNs, a Data Mover Agent, such as VSX 100, will read data from the source LUN and write the read data to any number of destination LUNs.

VSX 100 also makes sure that mirrored LUNs maintain consistency at all time. In one example, host computer 106 sends a write command for VLUN0 of VSX 100. VLUN0 (i.e., the object) within VSX 100 receives the write command and determines its mirroring structure to be composed of a mirrored pair VLUN1 and VLUN2. VLUN0 generates internal write commands to VLUN1 and VLUN2, so the same data will be written to both VLUN1 and VLUN2. Once VLUN1 and VLUN2 receive the write commands, VLUN1 and VLUN2 determine the configured structure under them, and generate internal commands to fulfill the internal command received from VLUN0. Then VLUN1 in turn generates write command(s) for PLUN1 and/or PLUN2. VLUN2 in turn generates internal write commands to a mirrored pair VLUN3 and VLUN4. VLUN4 then determines it is a concatenation of VLUN5, PLUN4, and PLUN5 and sends internal write command(s) to VLUN5 and/or PLUN4 and/or PLUN5. VLUN5 also determines it is a concatenation of PLUN6 and PLUN7 and sends internal write command(s) to PLUN6 and PLUN7. Eventually, all the write commands will reach the PLUN(s), and the external write command to VLUN0 will be fulfilled and data mirrored (or RAID operations completed). By means of the recursive nature of VLUN, they can be composed of other VLUNs and PLUNs, VLUNs can also recursively generate read/write commands to its next substructured VLUNs and PLUNs.

Figure 5:
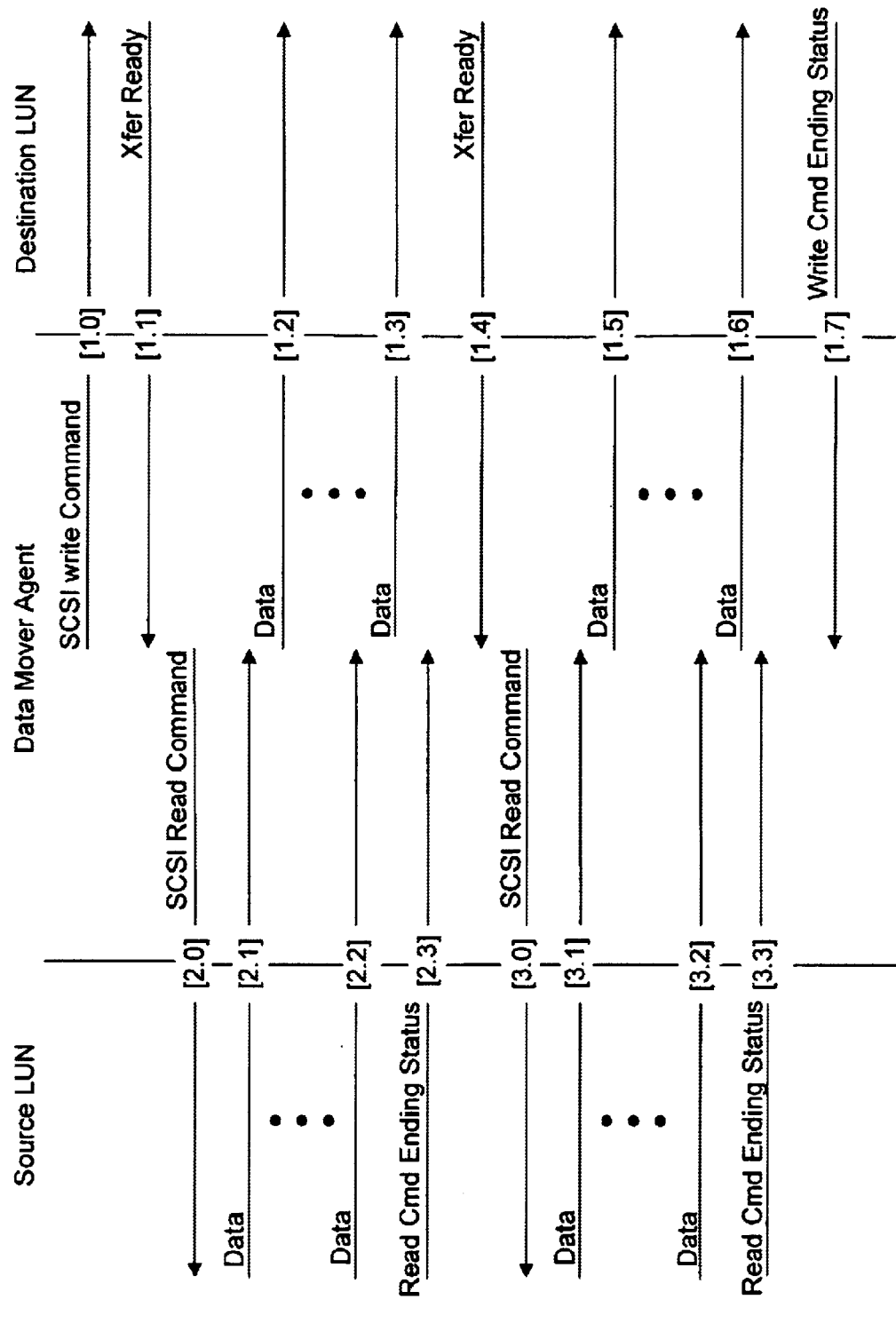
FIG. 5 illustrates a command sequence of transferring data from a source LUN to a destination LUN using the VSX according to one embodiment.

FIG. 5 shows an FCP (SCSI protocol over FC) command sequence for transferring data from a VLUN or PLUN to another VLUN or PLUN according to one embodiment of the present invention. The command sequence may be used for mirroring data, error recovery, transferring data, and other RAID functions. In one embodiment, a write command is sent to a destination LUN (which can be a VLUN within VSX 100 or PLUN of an external storage controller). The write command may then result in multiple read commands to the source LUN (which can be a VLUN within VSX 100 or a PLUN of an external storage controller) to satisfy the write command. In one example, the command sequence may be used to transfer data from any VLUN or PLUN to another VLUN or PLUN. For example, if VLUN4 and VLUN5 are used, VLUN4 is the source LUN 4 and VLUN5 is the destination LUN.

In one embodiment, VSX 100 uses a data streaming architecture (i.e., control information and data are passed in packets or frames) and only a small buffer may be used to temporarily store these packets for speed matching purposes. In one embodiment, up to a small number of data packets or frames may be stored. In most of the cases, a packet will be routed to the appropriate destination without buffering once it is received. A read command is not sent to a source LUN (VLUN or PLUN) before a write command is sent to a destination LUN (VLUN or PLUN). This is because once a read command is issued to a source LUN, data may be transferred from the source LUN even before the destination LUN is ready to receive the data or the destination LUN has not even accepted the write command.

In one embodiment, the following commands as depicted in FIG. 5, and other figures, are SCSI commands. However, it will be understood that a person skilled in the art will appreciate other commands that may be used.

Referring to FIG. 5, a write command [1.0] from a Data Mover Agent in VSX 100 is sent to a destination LUN for an amount of data.

After receiving write command [1.0], the destination LUN determines an amount of data that the LUN is ready to accept. In some cases, the destination LUN is only ready to accept part of the amount of data specified by the write command. In other cases, the destination LUN may be able to accept the full amount of data specified by the write command. For discussion purposes, it is assumed that the destination LUN is ready to receive an amount of data that is less than the amount of data that is specified by the write command.

The destination LUN sends a Transfer Ready Response [1.1] to VSX 100 indicating an amount of data it is ready to accept. A Transfer Ready Response is known in the art and need not be explained further. Additionally, a person of skill in the art will appreciate other responses that may be sent that indicate an amount of data the destination LUN is ready to receive.

Transfer Ready Response [1.1] is then received at VSX 100. In response, a read command [2.0] is issued to the source LUN for the ready amount of data.

After receiving read command [2.0], the source LUN transfers the ready amount of data to the destination LUN. The data is streamed through VSX 100. For each read command, the source LUN may send multiple data packets or frames to satisfy the command requirements. This is shown by data [2.1–2.2] and data [1.21 . . . 1.3] in FIG. 5. When the read command is satisfied, a read command ending status [2.3] is sent. The read command ending status indicates to VSX 100 that no more data will be transferred and that the Transfer Ready Response has been satisfied.

After the transfer of the ready amount of data from the source LUN to the destination LUN is completed, the destination LUN determines if the entire amount of data specified in the write command has been received. If the destination LUN has not received the entire amount of data specified in the write command, the process reiterates to the step where the destination determines a new amount of data it is ready to accept. The above described process then repeats itself.

In this process, the destination LUN then sends another Transfer Ready Response [1.4] to VSX 100 for a new ready amount of data. Transfer Ready Response [1.41] is received at VSX 100. A read command [3.0] is then issued to the source LUN for the ready amount of data.

The source LUN transfers the ready amount of data to the destination LUN in data [3.1 . . . 3.2] and data [1.5 . . . 1.6]. A read command ending status [3.3] is then sent.

The destination LUN then determines if the entire amount of data has been received for the write command. For the purposes of this example, the amount of data received does satisfy the write command and a write command ending status [1.71] is sent. However, if the entire amount of data has not been received, the process reiterates again. Accordingly, a process of issuing Transfer Ready Responses is continued until the sum of all transfer ready data requests equals the amount of data requested from the write command. Also, the sum of all read command data requests equals the amount of data requested in the write command.

Figure 6:
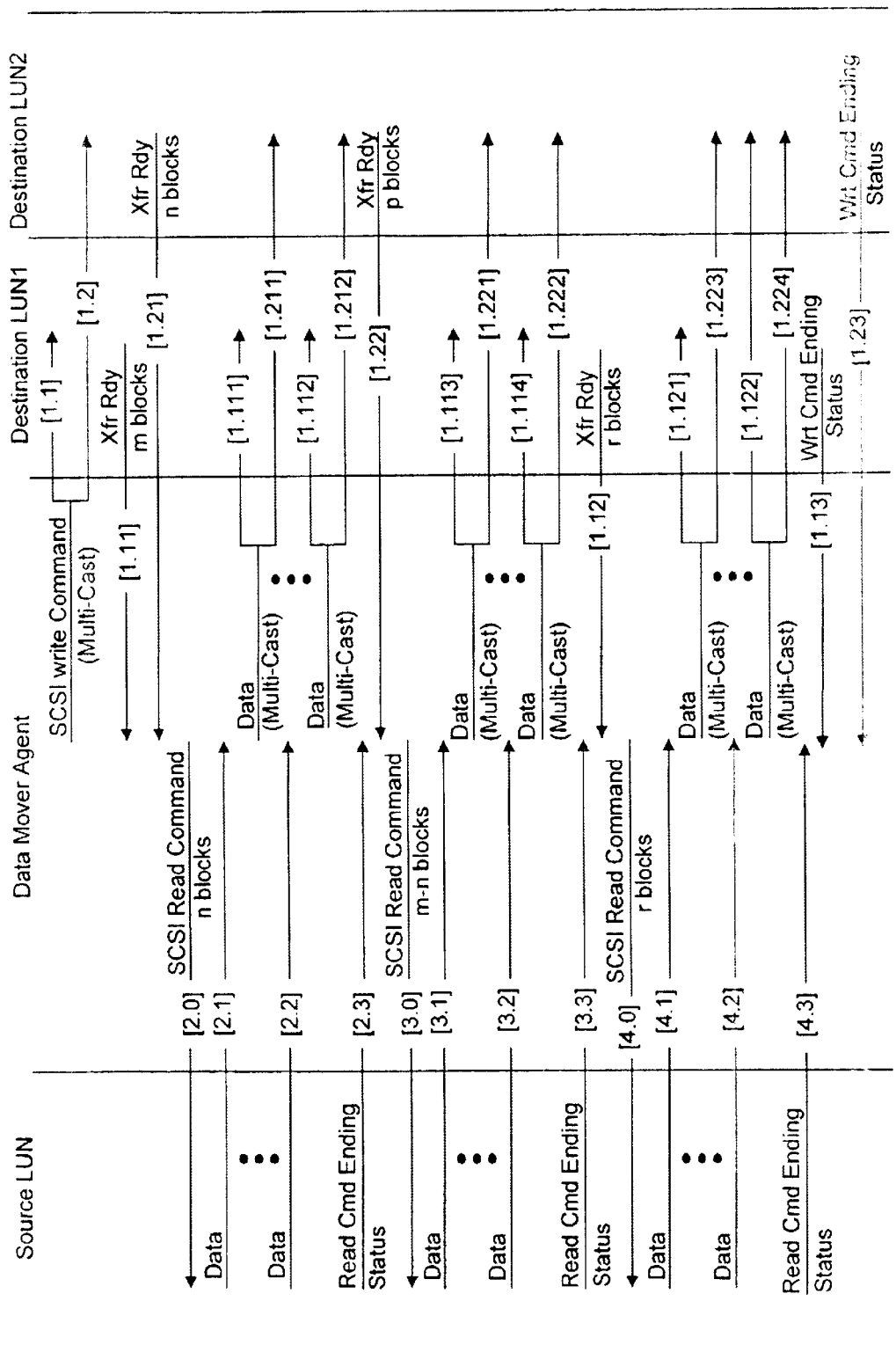
FIG. 6 illustrates a command sequence of mirroring data between a source LUN and a plurality of destination LUNs using the VSX according to one embodiment.

FIG. 6 illustrates a command sequence of a process for transferring data between a source LUN and a plurality of destination LUNs using VSX 100 according to one embodiment of the present invention. The command sequence may be used for mirroring data, error recovery, and other RAID functions. For example, the command sequence may be used to mirror data from any VLUN or PLUN to other VLUNs and/or PLUNs. Although only two destination LUNs are shown, it will be understood that any number of destination LUNs may be used.

In one embodiment, as described above, a process is performed that may use a small amount of buffering for speed matching purposes while transferring data between the source LUN and destination LUNs. In one embodiment, a small number of data packets or frames may be stored in a small buffer for the speed matching purpose. In most cases, however, no buffering is necessary. Thus, most frames will be routed to the destination right away without any buffering.

Referring to FIG. 6, write commands [1.1] and [1.2] are sent from VSX 100 to destination LUN1 and destination LUN2. In one example, write commands [1.1] and [1.2] may be for 40 Data Blocks to be written.

Destination LUN1 and destination LUN2 each determine an amount of data they are ready to receive. Destination LUN1 and destination LUN2 then both send a Transfer Ready Response to VSX 100. For example, destination LUN1 may send a Transfer Ready Response [1.11] for m Blocks of data and destination LUN2 may send a Transfer Ready Response [1.21] for n Blocks of data.

After receiving the Transfer Ready Responses, VSX 100 determines a smallest amount of data from the Transfer Ready Responses that may be transferred to destination LUN1 and LUN2. For example, if the Transfer Ready Response for destination LUN1 is m=20 Data Blocks and the Transfer Ready Response for destination LUN2 is n=10 Data Blocks, the minimum of N n=10 Data Blocks is chosen.

A read command [2.0] is then sent to the source LUN for the smallest amount of data (n Blocks in this example) determined from the Transfer Ready Responses received. The data is transferring from the source LUN to destination LUN1 and destination LUN2 through VSX 100. As shown, data [2.1 . . . 2.2] is transferred to VSX 100 and then multicast to destination LUN1 and destination LUN2 through data [1.111 . . . 1.112 and 1.21 . . . 1.212]. As mentioned above, the read command may be satisfied by any number of data transfers of data packets or frames.

A read command ending status [2.3] is sent after the amount of data has been sent. The process then determines if the write command has been satisfied. In one embodiment, the destination LUN will determine whether the write command has been satisfied when it receives all the data specified in the write command. Then the destination will send the Ending Status command of the write command to VSX 100 (which initiated the command to the destination LUN). If the write command has not been satisfied, the destination LUN that had its Transfer Ready Response satisfied determines a new amount of data that it is ready to receive. Continuing with the above example, the read command that was issued was for 10 Blocks satisfied the Transfer Ready Response for destination LUN2. Destination LUN2 then sends another Transfer Ready Response for another amount of data that it is ready to receive. For example, destination LUN2 is ready to receive p Blocks of data and sends Transfer Ready Response [1.22] for p Blocks.

VSX 100 again determines a smallest amount of ready data to be transferred to destination LUN1 and destination LUN2. In this case, the ready amount of data for the destination LUN that did not have its Transfer Ready Response satisfied is the original ready amount of data specified by the original Transfer Ready Response minus the amount of data transferred since the original Transfer Ready Response was sent. For example, destination LUN2 is ready to receive p=30 Blocks of data and destination LUN1 needs 10 Blocks of data (m−n=20 Blocks minus 10 Blocks). Thus, the minimum amount of data to be transferred is 10 Blocks of data. Thus, a read command [3.0] is issued for 10 Blocks and 10 Blocks of data is transferred from the source LUN to destination LUN1 and destination LUN2 in data [3.1 . . . 3.2] and data [1.113 . . . 1.114 and 1.221 . . . 1.222].

After the data has been transferred, Destination LUN1 and LUN2 then determine if the write command has been satisfied. In the example, the write command has not been satisfied. Also, destination LUN1 had its Transfer Ready Response satisfied and thus issues another Transfer Ready Response for a new amount of data. In this case, a Transfer Ready Response [1.12] for r Blocks is issued.

The process reiterates again and VSX 100 determine a smallest amount of ready data to be transferred to destination LUN1 and LUN2. For example, the Transfer Ready Response is equal to r=20 Blocks of data. In this case, the amount of data needed to satisfy the write command is the same for both destination LUNs. LUN1 needs 30−10=20 Blocks of data and LUN2 requires 20 Blocks of data. The process then continues as described above where a new read command [4.0] is issued for r Blocks of data and data for read command [4.0] is transferred from the source LUN to destination LUN1 and LUN2 in data [4.1 . . . 4.2] and data [1.121 . . . 1.222 and 1.223 . . . 1.224].

After the data is transferred, a read Command Ending Status [4.3] is sent to VSX 100. Additionally, when the write command is satisfied, write Command Ending Status commands [1.13 and 1.23] are sent from LUN1 and LUN2 to VSX 100.

It can be seen that the size of the smallest read data transfer is the amount that will satisfy at least one Transfer Ready Response from the destination LUNs.

After a VLUN has been mirrored with two or more LUNs that have exact copies, the process of handling read and write commands from host computer 106 will now be described. For purposes of this example, a VLUN M is composed of a mirrored pair of VLUNs, namely primary copy VLUN P and a secondary copy VLUN S1. A reason for having a primary copy is to provide a consistent view of data in case of any inconsistencies that may be suspected between mirrored copies due to any exception condition. For example, an inconsistency may result after a power outage but before the completion of a resynchronization of the mirrored data.

In one example, a host initiator may be a port on a host server of host computer 106. The host initiator initiates a read or write command to VLUN M. In one embodiment, the read or write command may be a SCSI command.

Additionally, VLUN M may also be acting as an internal initiator by initiating a read or write command to VLUN P or VLUN S1. This illustrates the concept of executing internal and external commands and internal commands recursively as described above.

Also, multiple commands may be issued to a LUN. Those commands may be reordered using simple queue tags to form an execution sequence for the receiving LUN or target LUN. The simple queue tag commands may even be executed concurrently depending on the capability of the receiving target. However, in certain situations, span locking requirements as described below will put a restriction on the concurrent or reordering command execution. For example, the span locking requirements may be of the form of a Read Span Lock or a Write Span Lock. In one embodiment, VSX 100 issues the Write Span Lock and Read Span Lock commands.

When a read command from an external host initiator or an internal initiator is issued to VLUN M, VLUN M (i.e., the object) in VSX 100 will issue a Read Span Lock for VLUN M to prevent subsequent write commands with overlapping (full or partial) spans from execution. If a write command issued for VLUN M and the write span overlaps with any prior read command, VSX 100 will put the write command in a wait queue until all prior read commands with overlapped Read Span Locks have been completed.

After receiving the data, VLUN M (i.e., the object) in VSX 100 then acts as an initiator and sends a read command to primary copy VLUN P in VSX 100. The read command is issued in response to the original read command received by VLUN M. VLUN M in VSX 100 also issues a Read Span Lock for VLUN M. As mentioned above, retrieving data from VLUN P is preferred and in one embodiment, the read command is sent to VLUN P first. Data sent from VLUN P to the read command initiator, VLUN M, will then be redirected by VLUN M to the original host initiator of the command. After completion of the read command, the read span lock is released by VSX 100.

If an error or exceptional condition preventing VLUN P from completing the data read occurs, VLUN M will initiate another read command to a selected secondary copy VLUN S1 to get the rest of the data. VLUN M is responsible to use the mirrored copies to do the recovery.

When VSX 100 receives a write command for VLUN M, VLUN M initiates a write span lock command that prevents other read or write commands with overlapping (full or partial overlap) spans from execution. If another subsequent read or write command has an overlapped data span, a subsequent command will be queued until the completion of the current command.

Figure 7:
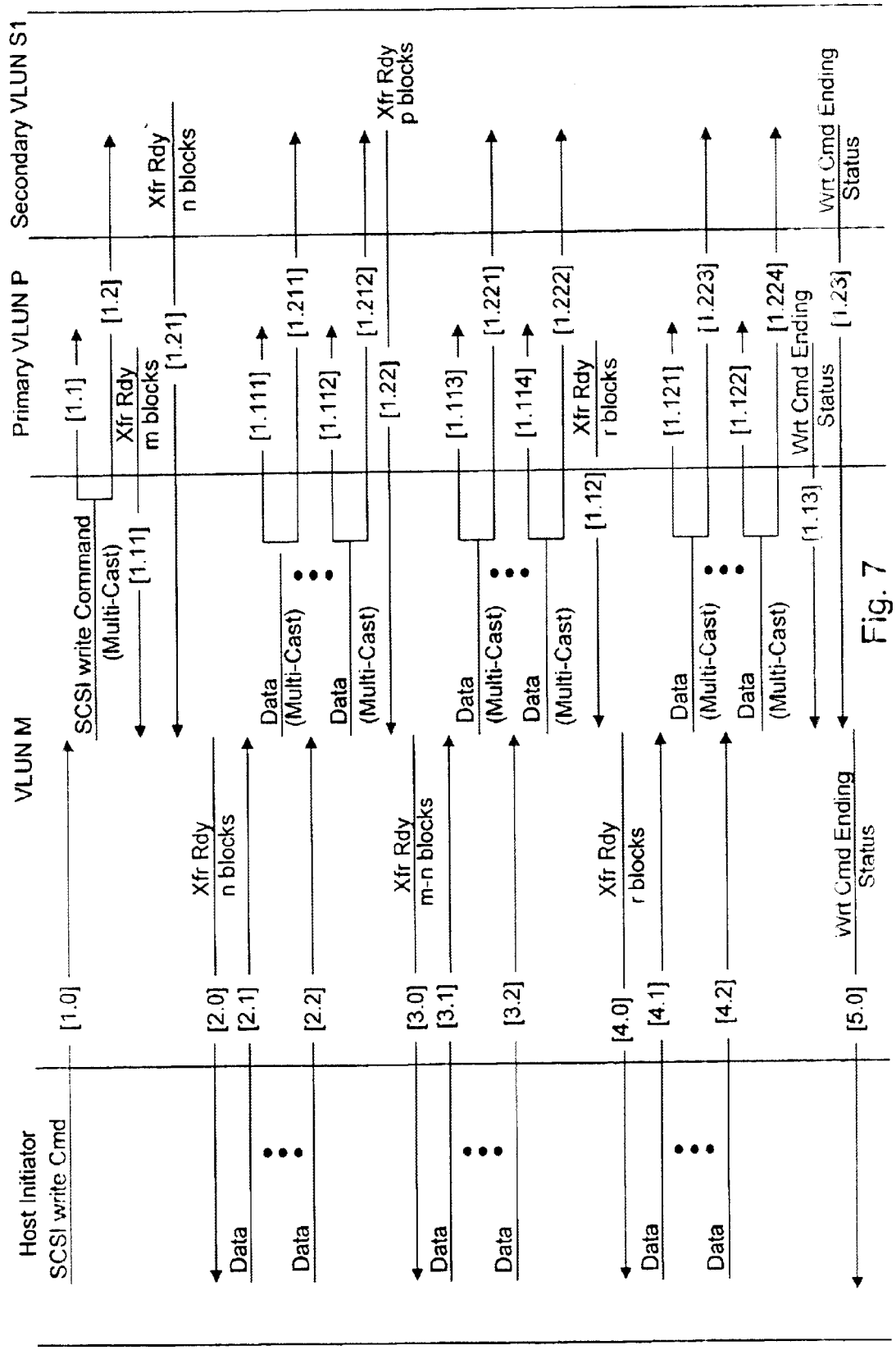
FIG. 7 illustrates a host write command sequence for a synchronous mirrored LUN pair according to one embodiment.

FIG. 7 illustrates a command sequence for a synchronous write sequence according to one embodiment. The command sequence may be used for mirroring data, error recovery, transferring data, and other RAID functions. A write command is received by VSX 100 from a host initiator for VLUN M. VLUN M then sends a write command to primary VLUN P and secondary VLUN S1. The process then proceeds is described in FIG. 6 with the exception that data is transferred from the host initiator to VLUN M in VSX 100, and then redirected by VLUN M to primary VLUN P and secondary VLUN S1. One other difference is VLUN M requests data using Transfer Ready Responses instead of read commands. Also, VLUN M is a logical entity within VSX 100.

Referring to FIG. 7, a write command [1.0] is sent to VLUN M in VSX 100. After receiving write command [1.0], VLUN M determines that it is composed of mirrored pair VLUN P and VLUN S1. VLUN M then generates internal write commands [1.1] and [1.2] to VLUN P and VLUN S1 for the same amount of data to be written. In one example, write command [1.0] is for 40 Blocks of data. Also, internal write commands [1.1] and [1.2] are for 40 Blocks of data.

VLUN P and VLUN S1 each determine an amount of data they are ready to receive. VLUN P and VLUN S1 then both send a Transfer Ready Response to VLUN M. For example, VLUN P may issue a Transfer Ready Response [1.1] for M Blocks of data and VLUN S1 may issue a Transfer Ready Response [1.21] for N Blocks of data to VSX 100.

After receiving the Transfer Ready Response, VLUN M determines a smallest amount of data from the Transfer Ready Responses that may be transferred to VLUN P and VLUN S1. For example, if the transfer ready command for VLUN P is M=20 Blocks and the Transfer Ready Response for VLUN S1 is N=10 Blocks, the minimum of N=10 Blocks is chosen.

A Transfer Ready Response [2.0] is then sent to the host initiator for the smallest amount of data (N Blocks in this example) determined from the Transfer Ready Responses received from VLUN P and VLUN S1. The data is transferred from the host initiator to VLUN M, and in turn redirected to VLUN P and VLUN S1 by VLUN M. As shown, Data [2.1 ... 2.2] is transferred to VLUN M and then from VLUN M to VLUN P and VLUN S1 in data [1.111 and 1.211]. As mentioned above, the Transfer Ready Response may be satisfied by any number of data transfers of data packets or frames.

The destination LUN then determines that it needs more data to complete the write command. If the write command has not been satisfied, the destination LUN that had its Transfer Ready Response satisfied determines a new amount of data that it is ready to receive. Continuing with the above example, the 10 Blocks of data received by each VLUN P and VLUN S1 satisfied the Transfer Ready Response for VLUN S1. VLUN S1 then sends another Transfer Ready Response for another amount of data that it is ready to receive. For example, VLUN S1 is ready to receive P Blocks of data and sends Transfer Ready Response [1.22] for P Blocks to command initiator which is VLUN M.

VLUN M again determines a smallest amount of ready data to be transferred to VLUN P and VLUN S1. In this case, the ready amount of data for any destination LUN that did not have its Transfer Ready Response satisfied is the original ready amount of data specified by the original Transfer Ready Response minus the amount of data transferred since the original Transfer Ready Response was sent. For example, VLUN S1 is ready to receive P=30 Blocks of data and VLUN P needs 10 Blocks of data (M−N=10). Thus, the minimum amount of data to be transferred is 10 Blocks of data. A Transfer Ready Response [3.0] of 10 Blocks of data is then sent from VLUN M in VSX 100 to the host initiator and 10 Blocks of data is transferred from the host initiator to VLUN M in Data [3.1 ... 3.2]. VLUN M then redirects the data to VLUN P and VLUN S1 in Data [1.113 ... 1.114 and 1.221 ... 1.222].

After the data has been transferred, VLUN P and VLUN S1 determine if the write command has been satisfied. In the example, the write command has not been satisfied. Also, VLUN P had its Transfer Ready Response satisfied and thus issues another Transfer Ready Response for a new amount of data. In this case, a Transfer Ready Response [1.12] for R Blocks from VLUN P is issued.

The process then reiterates again and VLUN M determines a smallest amount of ready data to be transferred to VLUN P and VLUN S1. For example, the Transfer Ready Response is equal to R=20 Blocks of data. In this case, the amount of data needed to satisfy the write command is the same for both destination LUNs. VLUN S1 needs 30−10=20 Blocks of data and VLUN P requires 20 Blocks of data. The process then continues as described above where a new Transfer Ready Response [4.0] is issued to the host initiator and data for the is transferred from the host initiator to VLUN M in data [4.1 . . . 4.2]. VLUN M then redirects the data to VLUN P and VLUN S1 in Data [1.121 . . . 1.122 and 1.223 . . . 1.224].

After the data is transferred, the write command is satisfied and write command ending status commands [1.13 and 1.23] are sent from VLUN P and VLUN S1 to VLUN M. VLUN M then sends a write command ending status [5.0] to the host initiator.

From the above, it can be seen that the smallest amount of ready data to be transferred from the initiator is the amount that will satisfy at least one Transfer Ready Response from those mirrored copy LUNs.

A large amount of data may be copied or mirrored using any of the above methods. While copying data, a tuning of the rate of copying data may be done. The tuning may be needed to ensure resources involved in the copying do not cause performance impact to normal operations, such as IOs with the host servers. The tuning may consider the resource availability of the source LUN, destination LUNs, and VSX 100 involved. The tuning may also include tuning a number of data Blocks (e.g. SCSI Blocks) that are issued for each write command to the destination LUN. Also, a number of consecutive write commands in a group to be issued to the destination LUN may be tuned. Also, a wait time between each group of write commands may be tuned.

Accordingly, embodiments under the present invention provide systems and methods for transferring and mirroring data in a RAID environment. The mirroring of data is mirrored in a multi-level hierarchical structure. Additionally, the methods may be implemented in a data streaming environment using a small amount of buffer space or no buffer space at all.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A Virtual Storage Server for transferring data in a storage environment from a source to one or more target destinations, the Virtual Storage Server including a processor memory comprising:
   (a) code for issuing a write command for a target amount of data to the one or more target destinations;
   (b) code for receiving one or more Transfer Ready Responses from the one or more target destinations for one or more amounts of data;
   (c) code for after issuing the write command, issuing a read command for an amount of data to be transferred to the source that is determined from the one or more amounts of data;
   (d) code for transferring the amount of data from the source to the one or more target destinations; and
   (e) code for repeating steps (b)–(d) until the target amount of data has been transferred to the one or more target destinations.

2. The Virtual Storage Server of claim 1, wherein the processor memory further comprises code for transferring the amount of data using an amount of buffer space less than said amount of data.

3. The Virtual Storage Server of claim 1, wherein the processor memory further comprises code for receiving the amount of data to be transferred from the source.

4. The Virtual Storage Server of claim 1, wherein the processor memory further comprises code for determining a minimum amount of data from the one or more amounts of data in the one or more Transfer Ready Responses.

5. The Virtual Storage Server of claim 4, wherein code for issuing a read command for the amount of data comprises code for issuing a read command for the determined minimum amount of data.

6. The Virtual Storage Server of claim 1, wherein the processor memory further comprises code for issuing a read span lock command to the source.

7. The Virtual Storage Server of claim 6, wherein the processor memory further comprises code for removing the read span lock command after receiving a write command status ending command from the one or more target destinations.

8. The Virtual Storage Server of claim 1, wherein the processor memory further comprises for issuing a write span lock command to the one or more target destinations.

9. The Virtual Storage Server of claim 8, wherein the processor memory further comprises code for removing the write span lock command after receiving a read command status ending command from the source.

10. A Virtual Storage Server for transferring data in a storage environment from a source to a plurality of target destinations, the Virtual Storage Server including processor memory comprising:
   (a) code for issuing a write command for a target amount of data to the plurality of target destinations;
   (b) code for receiving a Transfer Ready Response from each target destination in the plurality of target destinations, each Transfer Ready Response for an amount of data;
   (c) code for determining a minimum amount of data from the amounts of data for the Transfer Ready Responses;
   (d) code for after issuing the write command, issuing a read command for the minimum amount of data to the source;
   (e) code for transferring the minimum amount of data to the plurality of target destinations; and
   (f) code for repeating steps (b)–(e) until the target amount of data has been transferred to the plurality of target destinations.

11. The Virtual Storage Server of claim 10, wherein the processor memory further comprises code for transferring the amount of data using a small amount of buffer space.

12. The Virtual Storage Server of claim 10, wherein the processor memory further comprises code for receiving the minimum amount of data from the source.

13. The Virtual Storage Server of claim 10, wherein the processor memory further comprises code for issuing a read span lock command to the source.

14. The Virtual Storage Server of claim 13, wherein the processor memory further comprises code for removing the read span lock command after receiving a write command status ending command is received from the plurality of target destinations.

15. The Virtual Storage Server of claim 10, wherein the processor memory further comprises code for issuing a write span lock command to the plurality of target destinations.

16. The Virtual Storage Server of claim 15, wherein the processor memory further comprises code for removing the write span lock command after receiving a read command status ending command is received from the source.

17. A Virtual Storage Server for transferring data in a storage environment among a host, a first destination, and a plurality of target destinations, the Virtual Storage Server including a processor memory comprising:
 (a) code for receiving a write command from the host for a target amount of data;
 (b) code for issuing a write command for the target amount of data to the first destination;
 (c) code for issuing a write command for the target amount of data to the plurality of target destinations;
 (d) code for receiving a Transfer Ready Response from each target destination in the plurality of target destinations, each Transfer Ready Response for an amount of data;
 (e) code for determining a minimum amount of data from the amounts of data of the Transfer Ready Responses;
 (f) code for after issuing the write command for the target amount of data, issuing a Transfer Ready Response for the minimum amount of data to the host;
 (g) code for transferring the minimum amount of data to first destination;
 (h) code for transferring the minimum amount of data to the plurality of target destinations; and
 (i) code for repeating steps (b)–(h) until the target amount of data has been transferred to the target destination.

18. The Virtual Storage Server of claim 17, wherein the processor memory further comprises code for transferring the amount of data using a small amount of buffer space.

19. The Virtual Storage Server of claim 17, wherein the processor memory further comprises code for receiving the minimum amount of data from the host.

20. A method of mirroring data in a virtual storage environment including a plurality of virtual logical units (VLUNs), the VLUNs arranged in a hierarchy, the method comprising:
 sending a write command to a first VLUN and a second VLUN for an amount of data;
 transferring the amount of data to the first VLUN;
 transferring the amount of data to the second VLUN;
 determining, at the first VLUN, the hierarchy of the virtual storage environment related to the first VLUN, wherein the determined hierarchy indicates a third VLUN in which at least a portion of the amount of data should be transferred; and
 transferring the at least a portion of the amount of data to the third VLUN.

21. The method of claim 20, further comprising:
 determining, at the second VLUN, the hierarchy of the virtual storage environment related to the second VLUN, wherein the determined hierarchy indicates a fourth VLUN in which a second at least a portion of the amount of data should be transferred; and
 transferring the second at least a part of the data to the fourth VLUN.

22. A storage server for transferring data in a storage environment from a source to one or more target destinations, the storage server including a processor memory having a plurality of instructions configured to perform a set of steps comprising:
 (a) issuing a write command for a target amount of data to the one or more target destinations;
 (b) receiving one or more Transfer Ready Responses from the one or more target destinations for one or more amounts of data;
 (c) after issuing the write command, issuing a read command for an amount of data to be transferred to the source that is determined from the one or more amounts of data;
 (d) transferring the amount of data from the source to the one or more target destinations; and
 (e) repeating steps (b)–(d) until the target amount of data has been transferred to the one or more target destinations.

23. The storage server of claim 22, further comprising transferring the amount of data using an amount of buffer space less than said amount of data.

24. The storage server of claim 22, further comprising receiving the amount of data to be transferred from the source.

25. The storage server of claim 22, further comprising determining a minimum amount of data from the one or more amounts of data in the one or more Transfer Ready Responses.

26. The storage server of claim 25, wherein issuing a read command for the amount of data comprises issuing a read command for the determined minimum amount of data.

27. The storage server of claim 22, further comprising issuing a read span lock command to the source.

28. The storage server of claim 27, further comprising removing the read span lock command after receiving a write command status ending command from the one or more target destinations.

29. The storage server of claim 22, further comprising issuing a write span lock command to the one or more target destinations.

30. The storage server of claim 29, further comprising removing the write span lock command after receiving a read command status ending command from the source.

31. A storage server for transferring data in a storage environment from a source to a plurality of target destinations, the storage server including processor memory having a plurality of instructions configured to perform a set of steps comprising:
 (a) issuing a write command for a target amount of data to the plurality of target destinations;
 (b) receiving a Transfer Ready Response from each target destination in the plurality of target destinations, each Transfer Ready Response for an amount of data;
 (c) determining a minimum amount of data from the amounts of data for the Transfer Ready Responses;
 (d) after issuing the write command, issuing a read command for the minimum amount of data to the source;
 (e) transferring the minimum amount of data to the plurality of target destinations; and
 (f) repeating steps (b)–(e) until the target amount of data has been transferred to the plurality of target destinations.

32. The storage server of claim 31, further comprising transferring the amount of data using a small amount of buffer space.

33. The storage server of claim 31, further comprising receiving the minimum amount of data from the source.

34. The storage server of claim 31, further comprising issuing a read span lock command to the source.

35. The storage server of claim 34, further comprising removing the read span lock command after receiving a write command status ending command is received from the plurality of target destinations.

36. The storage server of claim 31, further comprising issuing a write span lock command to the plurality of target destinations.

37. The storage server of claim 36, wherein the processor memory further comprises removing the write span lock command after receiving a read command status ending command is received from the source.

38. A storage server for transferring data in a storage environment among a host, a first destination, and a plurality of target destinations, the storage server including a processor memory having a plurality of instructions configured to perform a set of steps comprising:

(a) receiving a write command from the host for a target amount of data;

(b) issuing a write command for the target amount of data to the first destination;

(c) issuing a write command for the target amount of data to the plurality of target destinations;

(d) receiving a Transfer Ready Response from each target destination in the plurality of target destinations, each Transfer Ready Response for an amount of data;

(e) determining a minimum amount of data from the amounts of data of the Transfer Ready Responses;

(f) after issuing the write command for the target amount of data, issuing a Transfer Ready Response for the minimum amount of data to the host;

(g) transferring the minimum amount of data to first destination;

(h) transferring the minimum amount of data to the plurality of target destinations; and (i) repeating steps (b)–(h) until the target amount of data has been transferred to the target destination.

39. The storage server of claim 38, further comprising for transferring the amount of data using a small amount of buffer space.

40. The storage server of claim 38, further comprising receiving the minimum amount of data from the host.

* * * * *